United States Patent [19]

Cook et al.

[11] Patent Number: 5,138,006
[45] Date of Patent: Aug. 11, 1992

[54] RADIATION POLYMERIZABLE STARCH ESTER-URETHANES

[75] Inventors: Phillip M. Cook; Chung M. Kuo, both of Kingsport; C. Rhea Dunn, Jr., Blountville, all of Tenn.

[73] Assignee: Eastman Kodak Company, Rochester, N.Y.

[21] Appl. No.: 652,969

[22] Filed: Feb. 11, 1991

[51] Int. Cl.$^5$ .................. C08G 18/00; C08B 31/00
[52] U.S. Cl. ................................ 527/301; 536/107
[58] Field of Search ....................... 527/301; 536/107

[56] References Cited

U.S. PATENT DOCUMENTS

| | | | |
|---|---|---|---|
| 4,147,603 | 4/1979 | Pacifici et al. | 522/33 |
| 4,490,516 | 12/1984 | Verbanac | 527/312 |
| 4,565,857 | 1/1986 | Grant | 527/301 |
| 4,839,230 | 6/1989 | Cook | 428/423.1 |
| 4,861,629 | 8/1989 | Nahm | 527/301 |

OTHER PUBLICATIONS

Kirk-Othmer, *Encyclopedia of Chemical Technology*, vol. 21, Wiley-Interscience, New York (1983), pp. 492–507.

C. A. Wilham et al., *Journal of Applied Polymer Science*, vol. 7, (1963), pp. 1403–1410.

*Primary Examiner*—Nathan M. Nutter
*Assistant Examiner*—Jeffrey Culpeper Mullis
*Attorney, Agent, or Firm*—Thomas R. Savitsky; Betty J. Deaton; William P. Heath, Jr.

[57] ABSTRACT

Modified starch ester-urethanes prepared by reacting a starch ester containing residual hydroxyl groups with an ethylenically unsaturated isocyanate. The grafted starch ester is a urethane-containing product having pendent groups such as alphamethylstyrene and/or methacrylate moieties. The starch ester-urethane is capable of undergoing crosslinking reactions on exposure to ultraviolet radiation in the presence of a photoinitiator, and optionally ethylenically unsaturated monomers or oligomers. The ethylenically unsaturated starch ester-urethanes of this invention are useful for protective coatings for wood, metal, and plastics.

17 Claims, No Drawings

5,138,006

RADIATION POLYMERIZABLE STARCH ESTER-URETHANES

FIELD OF INVENTION

The present invention relates to a modified starch ester-urethane, preparation thereof and compositions thereof.

BACKGROUND OF THE INVENTION

Starch has been used for a variety of coating and adhesive applications for textiles and wood products. Its utility is due in part to its ready availability, low cost, and hydrophilic nature. Since starch-based coatings, sizings, and adhesives require water for application, they are not generally considered suitable for protective purposes because of their sensitivity to water (i.e., dissolution or swelling).

For example, allyl starch was examined extensively by Wilham et al. (*J. Poly. Sci.*, Vol. 7, pp. 1403–1410 (1963)). His conclusions regarding use of allyl starch in coating applications were negative because the material had limited solvent solubility and was difficult to apply. The films were brittle and had poor water resistance. Hydroxyalkyl ethers are commercially available but are not useful in protective coatings due to poor water resistance. Such ethers are of low DS (0.05–0.1) since higher substitute ethers are difficult purify and filter (Kirk Othmer Vol. 21, pp. 502–505).

Starch esters such as starch acetates at low acetyl content (degree of substitution <1) are useful in stabilizing aqueous starch dispersions/emulsions for food use. At higher acetyl contents (degree of substitution >1) these materials yield clear films but continue to exhibit brittleness and are damaged by organic solvents. Thus, like starch ethers, starch esters would not protect substrates against organic solvents and water. Neither starch esters nor starch ethers are therefore expected to be efficacious in protective coating applications.

Because starch is relatively economical, readily available, and a renewable resource, it would be desirable to develop a starch-based coating that would protect against abrasion and have resistance to common organic solvents and water.

Protective coatings can be either thermoplastic or thermosetting. Each type has its own set of advantages. Thermoplastic coatings are easier to handle. For example, a starch or cellulose ester would be dissolved in an organic solvent and applied to the substrate in a variety of ways. The main disadvantage of thermoplastic coatings is that they are easily dissolved or swollen by solvents. Thermosetting coatings are usually much harder to handle and not all substrates can tolerate high temperatures or strict humidity conditions often needed. Despite their difficulty in handling, thermosetting coatings offer much greater resistance to abrasion and solvents.

It would thus be desirable to combine the advantages of thermoplastic and thermosetting coatings. Ease of handling and enhanced cured-film properties would accrue.

Photo-activated curing of a thermoplastic coating containing grafted ethylenic unsaturation can be used to accomplish this. In the presence of a photo-initiator, exposure to ultraviolet radiation can induce interchain reactions between pendent ethylenic unsaturated groups to yield a three dimensional polymeric network with greatly improved resistance to abrasion and solvents (see, for example, U.S. Pat. Nos. 4,839,230 and 4,565,857).

It is thus the objective of this invention to describe the preparation and use of novel photo-curable, starch ester-urethanes that can be applied from organic solvents and used to form protective coatings with enhanced solvent and scratchresistant properties.

SUMMARY OF THE INVENTION

The present invention is directed to a starch ester-urethane having a starch backbone and containing an ester of at least one $C_1$–$C_4$ carboxylic acid at a degree of substitution per anhydroglucose unit (DS/AGU) of about 0.1 to about 2.5, and further containing at least one ethylenically unsaturated group bonded to the starch backbone via a urethane bond at a DS/AGU of about 0.1 to about 2.0.

The present invention is also directed to a coating composition comprising:

(A) a starch ester-urethane having a starch backbone and containing an ester of at least one $C_1$–$C_4$ carboxylic acid at a DS/AGU of about 0.1 to about 2.5, and further containing at least one ethylenically unsaturated group bonded to the starch backbone via a urethane bond at a DS/AGU of about 0.1 to about 2.0, and (B) a solvent in an amount to solubilize (A).

The present invention also contemplates a method for curing the coating composition of the invention comprising exposing said composition to ultraviolet radiation under conditions effective to result in a substantially crosslinked coating, as well as a coated article comprising (i) a substrate, and
(ii) a coating thereon comprising a polymerized starch ester-urethane having a starch backbone and containing an ester of at least one $C_1$–$C_4$ carboxylic acid at a DS/AGU of about 0.1 to about 2.5, and further containing at least one ethylenically unsaturated group bonded to the starch backbone via a urethane bond at a DS/AGU of about 0.1 to about 2.0.

Finally, the present invention is directed to a process for preparing a starch ester-urethane having a starch backbone and containing an ester of at least one $C_1$–$C_4$ carboxylic acid at a DS/AGU of about 0.1 to about 2.5, and further containing at least one ethylenically unsaturated group bonded to the starch backbone via a urethane bond at a DS/AGU of about 0.1 to about 2.0 comprising:

(1) contacting starch with an anhydride of one or more $C_1$–$C_4$ carboxylic acids in the presence of a catalytic amount of an acid catalyst and a $C_1$–$C_4$ carboxylic acid solvent to form a starch ester having a DS/AGU of about 3, (2) contacting the starch ester produced from step (1) with a neutralizing agent and a hydrolytic agent under conditions to result in a starch ester having a DS/AGU of about 0.1 to about 2.5, (3) removing said hydrolytic agent to result in a substantially water-free starch ester, and (4) contacting the starch ester resulting from step (3) with an ethylenically unsaturated isocyanate compound in a non-hydroxylic solvent in the presence of a catalytic amount of a urethane bondforming catalyst under conditions that promote formation of the desired starch ester-urethane.

DETAILED DESCRIPTION OF THE INVENTION

The starch ester-urethanes of the present invention are hydrophobic and contain ethylenic unsaturation which, in the presence of a free radical initiator, and optionally ethylenically unsaturated comonomers or oligomers, undergo crosslinking reactions to provide high performance coatings with enhanced solvent and abrasion-resistant properties.

Starch is a polysaccharide which occurs in most plants. Some well-known sources are wheat, corn, barley, rice, tapioca, and potatoes. Most starch granules contain a mixture of two polysaccharides: amylose and amylopectin. Amylopectin is the major component of naturally occurring starch (typically about 70–80% by weight) and contains highly branched macromolecules of (1–4)-alpha-linked D-glucopyranosyl units with (1–6)-alpha-links at branch points. Amylose, the minor component (typically about 20–30% by weight) of naturally occurring starch consists mainly of (1–4)-alpha-linked D-glucopyranosyl residues. The following figure illustrates the similarity of structure between the two polymers:

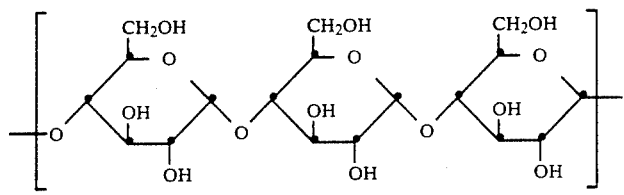

Amylose

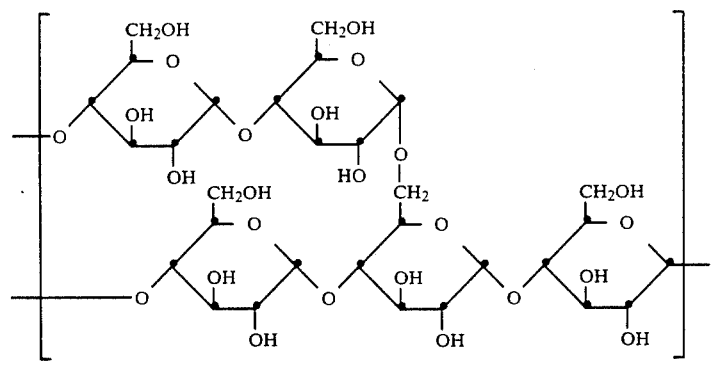

Amylopectin

Most any type of starch is useful in the present invention, for example, pure amylose, high-amylose starch (available as Amylomaize VII, 70% amylose from American Maize, Hammond, Ind., U.S.A.), pearl corn starch (available from Grain Processing Corporation, Muscatine, Iowa, U.S.A.), and the like are suitable.

Examples of starches useful for preparing the starch ester-urethane of the invention are those starches that comprise at least about 70 weight % repeating units from amylose, those that comprise at least about 20 weight % repeating units from amylopectin. Starches containing any mixture of repeating units from amylose and amylopectin are specifically contemplated to be within the scope of the invention. A preferred form of starch contains about 70 to about 100 weight % repeating units from amylose.

The ester portion of the starch ester-urethane is preferably an ester of a carboxylic acid selected from acetic acid, propionic acid, butyric acid, or a mixture thereof.

The ethylenically unsaturated group of the starch ester-urethane of the invention is preferably derived from m-isopropenyl-2,2'-dimethylbenzyl isocyanate, 2-isocyanatoethyl methacrylate, or a mixture thereof.

It is preferred wherein the starch ester-urethane of the invention has an ester degree of substitution (DS) per anhydroglucose unit (AGU) of about 1.5 to about 2.5 and a urethane DS/AGU of about 0.3 to about 0.9, and wherein the intrinsic viscosity of said starch ester-urethane is about 0.2 to about 0.5, measured on a 60:40 parts by weight solution of perchloroethylene:phenol at a concentration of 0.5 g/100 ml solvent at 25° C.

For the coating composition of the invention it is preferred that the solvent is a non-hydroxylic, urethane grade solvent and the weight ratio of solvent:starch ester-urethane is about 1:1 to about 1:20.

More preferred is wherein the solvent for the coating composition is benzene, toluene, xylene, methylene chloride, perchloroethylene, chloroform, carbon tetrachloride, chlorobenzene, acetone, 2-butanone, 2-pentanone, methyl acetate, ethyl acetate, propyl acetate, butyl acetate, methyl propionate, ethyl propionate, a dialkylether of ethylene glycol wherein the alkyl groups contain 1 to 4 carbon atoms, a dialkylether of propylene glycol wherein the alkyl groups contain 1 to 4 carbon atoms, or a mixture thereof; and wherein said solvent is present at a weight ratio to the starch ester-urethane of about 1.5:1 to about 5:1.

The coating compositions of the present invention optionally contain a photoinitiator (i.e., a free radical initiator). The amount of photoinitiator is typically about 2 to about 8 weight % based on the weight of the starch ester-urethane of the coating composition; preferably about 3 to about 5 weight %. Suitable photoinitiators include acetophenone/ and benzophenone/tertiary amine combinations, organic peroxides, benzoin and its ethers, benzil and benzil ketals. A typical photoinitiator is Irgacure® 651, available from Ciba-Geigy.

The coating composition may optionally contain other formulation additives which contribute to the nonvolatile content of the composition. Such additives include, for example, leveling agents, antifoamants, and the like. Such additives may be present in an amount of from about 0.1 to about 5 weight % of total coating composition, preferably about 0.1 to about 1.0 weight %.

It is also preferred that said coating composition further comprises about 1 to about 95 weight % of a copolymerizable oligomer, monomer or a mixture thereof, and preferably about 10 to about 90 weight %, said percentages being based on the total weight of the starch ester-urethane. Typical copolymerizable oligomers and/or monomers include N-vinylpyrrolidone, methyl methacrylate, trimethylolpropane triacrylate, diethylene glycol diacrylate, acrylated polyurethanes, acrylated polyesters, acrylated polyethers, and the like.

Regarding the coated article of the invention it is preferred that the cured coating has a pencil hardness of at least F using ASTM Procedure D-3363 and a percent acetone insolubles of at least about 85%.

To prepare the coated article of the present invention, the starch ester-urethane of the present invention is applied to a substrate and then is cured (i.e., polymerized and crosslinked), in the presence of a photoinitiator such as Irgacure® 651 benzil ketal, Irgacure® 184 benzil, or Darocure® 1173 benzil, by an amount of ultraviolet light sufficient to effect the desired degree of curing. The substrate can be wood; plastic; metal such as aluminum or steel; cardboard; glass; cellulose esters such as cellulose acetate butyrate sheeting; various blends containing, for example, polypropylene, polypropylene and glass, polycarbonate, and various polyesters such as polyethylene terephthalate; as well as other solid substrates.

The curing of the starch ester-urethanes of the present invention can be carried out in the liquid or solid state (i.e., as a dry film).

Depending upon the thickness of the coating (film), product formulation, photoinitiator type, radiation flux, and source of radiation, exposure times to ultraviolet radiation of about 0.5 to 10 seconds are typically required for curing.

Esterification of starch can be carried out in several ways. One way is to react starch with an acyl halide in the presence of a proton acceptor. Suitable acyl halides would include, but not be limited to, acetyl chloride, acetyl bromide, propionyl chloride and butyryl chloride. Useful proton acceptors would include, but not be limited to: trialkylamines such as triethylamine, tributylamine, N,N-dimethylcyclohexylamine, N-methylpyrrolidine; aromatic amines such as pyridine and substituted pyridines; inorganic salts of weak acids such as sodium carbonate, sodium acetate, and sodium bicarbonate.

The preferred method of preparation of starch esters suitable for this invention involves reaction of the starch with organic carboxylic anhydrides in the presence of an acid catalyst and an organic carboxylic acid solvent. Esterification of starch involves the steps of water-activation or swelling to increase reactivity, exchange of the water for an organic acid solvent, esterification using an appropriate anhydride, organic acid solvent, and acid catalyst, followed by hydrolysis to adjust the molecular weight and degree of esterification, filtration, water-washing, and drying.

The reactivity of starch toward esterification is greatly improved by swelling or "activating" it with water. Slurrying starch in water for about 0.5 to about several hours causes the starch to become greatly swollen and accessible to the esterifying reagents. After the swelling or activation process is complete, the water is exchanged for an appropriate organic acid solvent such as acetic, propionic, or butyric acid by slurrying the swollen starch in the organic acid solvent, decanting the liquid, and repeating the process until the mass of starch is substantially devoid of water. The final starch :solvent ratio can vary from about 0.05 to about 1.5 with about 1.0 being the preferred ratio.

The starch esters of this invention include, but are not limited to, those esters formed by reacting the activated starch with lower alkyl carboxylic anhydrides such as anhydrides of acetic, propionic, and butyric acids and mixtures thereof. Mixed starch esters such as acetate butyrate and acetate propionate would usually use acetic acid to displace the water used in the starch swelling or "activation" state, propionic or butyric acids as the esterification solvent, and propionic or butyric anhydride as the esterifying reagent. The typical range of esterifying solvent to dry starch content is about 20:1 to about 4:1 with the preferred ratio being about 6:1 by weight. The typical ratio of esterifying reagent (anhydride) to dry starch content is about 3.0 to about 6.0 mole ratio with the preferred range being about 3.3 to about 4.5 mole ratio.

The esterification is carried out under the influence of a strong acid catalyst or mixture thereof examples of which are: organosulfonic acids such as methanesulfonic acid, methane disulfonic acid, toluenesulfonic acid; and strong mineral acids such as hydrochloric, sulfuric, and phosphoric acid. The typical catalyst concentration is 2 to 6% based on the weight of the dry starch.

Starch esters prepared in the above manner are predominately at the tri-ester stage and require hydrolysis to adjust the ester content and the molecular weight. This is accomplished by neutralization of the strong acid catalysts and addition of water to the esterification reaction. The batch is refluxed until the desired level of hydrolysis is achieved as determined by measuring the ester content and intrinsic viscosity. Useful alkaline materials that can be used to neutralize the acid catalysts include, but are not limited to: salts of alkaline and alkaline earth compounds such as sodium acetate, sodium carbonate, sodium hydroxide, potassium carbonate, potassium acetate, magnesium acetate, calcium carbonate, and calcium hydroxide.

The amount of water added to the esterification reaction to begin the hydrolysis stage is dependent on a variety of factors such as hydrolysis temperature, catalyst concentration, the desired rate of hydrolysis, and the like. Nevertheless, the amount of water added must be so the cloud-point is not exceeded and the starch ester is not precipitated as a result. The typical water content of the hydrolysis step is about 5 to 25% based on the total weight of the reaction mixture (batch) with the preferred range being about 12 to 18%.

After the starch ester is prepared and dried (i.e., after performing steps (1), (2), and (3)), it is dissolved in a non-hydroxylic solvent and reacted with an ethylenically unsaturated isocyanate in the presence of a urethane-bond promoting catalyst. The non-hydroxylic solvent must be substantially free of water. Preferred solvents are referred to as "urethane grade" and typically have a water content of <0.05% by weight. Such non-hydroxylic, urethane-grade solvents include, but are not limited to: aromatic hydrocarbons such as benzene, toluene, and xylene; chlorinated alkyls and aromatics such as methylene chloride, perchloroethylene, chloroform, carbon tetrachloride, and chlorobenzene; ketones such as acetone, 2-butanone, and 2-pentanone; organic esters such as methyl acetate, ethyl acetate, propyl acetate, butyl acetate, methyl propionate, ethyl propionate, and the like; organic ethers such as dialkylethers wherein the alkyl groups contain 1 to 4 carbon atoms such as dialkylethers of ethylene and propylene glycols. The typical ratio of solvent to dry starch ester is about 1:20 with the preferred ratio being about 1.5 to 5.

Suitable urethane-bond promoting catalysts include dialkyltin ethers, tertiary amines, and mixtures thereof. Specific examples include, but are not limited to, diethyl and dibutyltin dilaurates, triethylamine, pyridine, diazobicyclo-octane, and dimethylaminopyridine. The typical concentration used is about 0.1% to 5.0% based on the weight of the ungrafted starch ester.

The synthesis processes of the present invention preferably proceed in the presence of a polymerization inhibitor to prevent premature curing. Typically, the amount of polymerization inhibitor is about .01% to about 1.0 weight % based on the weight of cellulose ester. Specific examples of polymerization inhibitors include, but are not limited to, hydroquinone monomethyl ether, chloranil, hydroquinone, and phenothiazine.

In the process of the invention preferred conditions include wherein for step (1) the molar ratio of anhydride:starch is about 3:1 to about 6:1, the amount of strong acid catalyst is about 2 to about 6% based on the weight of starch, and the weight ratio of carboxylic acid solvent:starch is about 4:1 to about 20:1; for step (2) the molar ratio of neutralizing agent:starch ester is about 2:1 to about 10:1; and for step (4) the amount of isocyanate compound is about 1 to about 30% based on the dry weight of starch ester and the weight ratio of non-hydroxylic solvent:starch ester is about 1.5:1 to about 20:1.

In the synthesis processes of the present invention the reaction is performed under conditions such that the desired product is formed. Typically the reaction period is about 4 to about 30 hours, preferably about 6 to about 22 hours. The temperature during reaction is typically about 40° C. to about 160° C., preferably about 55° C. to about 100° C.

The following examples are to illustrate the invention but should not be interpreted as a limitation thereon.

EXAMPLE 1

Preparation of Starch Acetate Propionate from Pearl Corn Starch

Pearl corn starch (150 grams) commercially available from Grain Processing Corporation, Muscatine, Iowa, U.S.A., is slurried in water (150 grams) at 22° C. for 60 minutes. The water in the starch slurry is then replaced with acetic acid so the starch:acetic acid weight ratio is about 1.0. To this slurry is added a catalyst mixture containing phosphoric acid (3.0 grams) and methanesulfonic acid (6 grams) followed by addition of an esterification mixture of propionic anhydride (450 grams) and propionic acid (900 grams). The batch is heated to 80° C. over a two-hour period. The acid catalysts are neutralized by addition of 22 grams of magnesium acetate, 200 grams of water, 100 grams of acetic, and 200 grams of propionic acid. The water content of the resultant solution is then adjusted to 15 weight %, based on total weight of the batch. The resultant mixture is refluxed (100°–105° C.) for 24 hours. The resultant hydrolyzed starch acetate propionate solution is filtered and precipitated into water with agitation. The precipitated product is washed with water and dried at 60° C. in a forced air oven. The substituent content is 6.6% acetyl ester, 35.5% propionyl ester, and 5.3% hydroxyl content by weight.

EXAMPLE 2

Preparation of Starch Acetate Butyrate from Pearl Corn Starch

In similar manner pearl corn starch is esterified with butyric anhydride in butyric acid/acetic acid solvent to yield a white powder with a substituent content of 6.8% acetyl, 41.0% butyryl, and 4.2% hydroxyl content.

EXAMPLE 3

Preparation of Amylose Acetate Propionate from High Purity Amylose

High purity amylose (150 grams) commercially available from Accurate Chemical and Scientific Corporation, Westbury, N.Y., is slurried in 150 grams of water at 22° C. for 60 minutes. The amylose is filtered and the water is displaced with acetic acid. The amylose:acetic acid ratio is adjusted to about 1.0. To the swollen amylose is added 450 grams of propionic anhydride and 900 grams of propionic acid, followed by a catalyst mixture consisting of 3 grams of phosphoric acid and 5 grams of methanesulfonic acid dissolved in 50 grams of acetic acid. The temperature is allowed to rise from 23° C. to about 55° C. whereupon the off-white mixture thickens and becomes a slightly hazy, gel-free dope. The batch is stirred at 55° C. for about 30 minutes. Then the acid catalysts are neutralized by addition of 7 grams of magnesium carbonate, 100 grams of water, 96 grams of propionic acid and 48 grams of acetic acid. The batch is stirred for about 15 minutes then 12.5 grams of magnesium acetate, 384 grams of water, 288 grams of propionic acid and 144 grams of acetic acid are added. The resulting mixture is refluxed (106° C.) for 10 hours and then filtered to remove insolubles. The product is precipitated by addition of the batch to 2500 ml of water with agitation. After filtration of the slurry, the precipitated product is filtered, waterwashed, and dried at 60° C. in a forced air oven. The dried product weighs 230 grams and has a substituent content of 6.9% acetyl ester, 35.9% propionyl ester, and 4.8% hydroxyl content by weight.

EXAMPLE 4

Preparation of Starch Acetate Propionate from High Amylose (70%) Starch

High amylose (70%) starch (150 grams) known as Amylomaize VII and commercially available from American Maize Products Company, Hammond, Ind., is stirred at 22° C. with 150 grams of water for 60 minutes. The water is displaced with acetic acid so the final acetic acid:starch ratio is about 1.0. To this slurry are added 900 grams of propionic acid and 450 grams of propionic anhydride followed by a mixture of 3 grams of phosphoric and 6 grams of methanesulfonic acid in 50 grams of acetic acid. The temperature rises from 22° to 80° C. over a period of 1.5 hours. The catalysts are neutralized by addition of 7.5 grams of magnesium carbonate, 100 grams of water, 96 grams of propionic acid, and 48 grams of acetic acid. After stirring for 15 minutes, 12.5 grams of magnesium acetate, 384 grams of water, 288 grams of propionic acid, and 144 grams of acetic acid are added. The batch is refluxed (106° C.) for 24 hours, filtered, and precipitated by drowning into 12 liters of water. The batch is filtered, waterwashed, and dried in a 60° C. forced air oven to yield 244 grams of white powder. The substituent content is found to be 5.0% acetyl ester, 37.0% propionyl ester, and 5.6% hydroxyl content.

EXAMPLE 5

Preparation of Amylose Acetate from High Purity Amylose

High purity amylose (350 grams) is slurried in 350 grams of water at 22° C. for one hour. Then the water is displaced by filtering the swollen amylose and washing with acetic acid until the water content is substantially absent. The activated amylose is slurried in 2450 grams of acetic acid. To this is added 1050 grams of acetic anhydride followed by 6.5 grams of phosphoric acid and 1.5 grams of methanesulfonic acid. The temperature rises from 24° C. to 52° C. over a 1 hour period. Then the catalysts are neutralized by addition of 8 grams of magnesium carbonate and 500 grams of acetic acid. After stirring for about 30 minutes, 160 grams of water and 200 grams of acetic acid are added and the batch is stirred for an additional 30 minutes. The batch is then precipitated by adding to 12 liters of water with rapid agitation. The product is filtered, water-washed, and dried at 60° C. in a forced air oven. The acetyl ester content is 36.4%, and the hydroxyl content is 5.8%.

EXAMPLE 6

Preparation of Amylose Acetate Grafted with Meta-Isopropenyl-2,2'-Dimethylbenzyl Isocyanate (TMI)

In a flask equipped with a mechanical stirrer, thermometer, reflux condenser, and nitrogen inlet are placed 25 grams of dry amylose acetate prepared in Example 5 (36.4% acetyl ester and 5.8% hydroxyl content), 300 grams of urethane-grade propyl acetate, 0.025 grams of dibutyltin dilaurate, and 16 grams of meta-isopropenyl-2,2'-dimethylbenzyl isocyanate. The batch is refluxed under a nitrogen blanket for 16 hours until the -NCO stretching frequency at 2280 cm in the infrared spectrum of the reaction mixture is nearly absent. The batch concentration is adjusted to 68% by distillation of solvent. The modified starch ester is cooled and bottled for evaluation.

The product is also isolated as a powder by adding a portion of the propyl acetate solution containing the product to an equal volume of heptane with high shear agitation. The product is filtered, washed with heptane, and dried in a 60° C. forced-air oven.

EXAMPLE 7

Preparation of Starch Acetate Propionate Grafted with TMI

Using the same equipment as above, 25 grams of dry starch acetate propionate prepared in Example 4 is dissolved in 300 grams of propyl acetate. To this is added 14 grams of meta-isopropenyl-2,2'-dimethylbenzyl isocyanate and 0.025 grams of dibutyltin dilaurate. The batch is refluxed under a nitrogen blanket for 16 hours until the 2280 cm stretching frequency in the infrared spectrum is nearly absent. The batch is concentrated to 64% solids by distillation of solvent, cooled, and bottled for evaluations.

EXAMPLE 8

Preparation of Starch Acetate Butyrate with TMI

Using the equipment described above, 25 grams of dry starch acetate butyrate from Example 2 is dissolved in 300 grams of propyl acetate solvent containing 11 grams of meta-isopropenyl-2,2'-dimethylbenzyl isocyanate and 0.050 grams of dibutyltin dilaurate. The batch is refluxed for 16 hours until the reaction is judged to be complete according to the infrared spectrum. The batch is concentrated to 69% solids by distilling out solvent.

EXAMPLE 9

Preparation of Amylose Acetate Grafted with 2-Isocyanatoethyl Methacrylate (IEM)

Using the equipment described above, 25 grams of amylose acetate prepared in Example 3 is added to 300 grams of propyl acetate containing 0.025 grams of dibutyltin dilaurate, 5.5 grams of 2-isocyanatoethyl methacrylate, and 0.025 grams of hydroquinone monomethyl ether (HQMME). The batch is refluxed for 6 hours until the reaction is complete according to the infrared spectrum and then concentrated to 70% solids.

EXAMPLE 10

Preparation of Starch Acetate Propionate Grafted with IEM

Using the equipment described above, 25 grams of starch acetate propionate prepared in Example 1 is added to 300 grams of propyl acetate containing 0.025 grams of dibutyltin dilaurate, 0.025 grams of HQMME, and 11.5 grams of 2-isocyanatoethyl methacrylate. The batch is refluxed for 16 hours until the reaction is substantially complete according to the infrared spectrum of the reaction mixture. The batch is concentrated to 66% and then bottled for evaluation.

Intrinsic Viscosity Measurements

Solutions are made up for each powdered product isolated from Examples 1-10 by dissolving 0.50 grams in 100 ml of solvent (60:40 parts by weight of phenol:perchloroethylene). The viscosity of each solution is measured at 25° C. using a modified Wagner viscometer.

Coating Compositions

Propyl acetate solutions of all grafted starch esters and cellulose esters are prepared which contain about 30% by weight of the particular ester. These solutions are then used to prepare formulations optionally containing a copolymerizable oligomer (Ebecryl 220, available from RADCURE Specialties, Norfolk, Va.) and a photoinitiator (Irgacure 651, from Ciba-Geigy, Hawthorne, N.Y.). The oligomer, when used, is done so at a concentration of 4% each based on the weight of the modified starch or cellulose ester content. Sufficient propyl acetate solvent is added to each formulation to bring the modified starch ester-urethane and cellulose ester controls concentration to 25% by weight.

Coating of Substrates

A knife blade or draw-down rod is used to coat glass, metal, and wood with each of the above formulations. The wet film thickness is approximately 8 mils. The coated substrates are placed under an inverted three-inch deep pan. The solvent evaporates over an 18hour period to give a clear, non-tacky film with a thickness of about 1–1.5 mils. All non-cured films quickly dissolve in acetone.

Film Curing

The dried film is exposed to ultraviolet radiation from a 200 watt per inch medium pressure mercury vapor lamp housed in an American Ultraviolet Company instrument using a belt speed of 25 feet per minute. About one to ten passes under the lamp result in a crosslinked coating with maximum hardness and solvent resistance.

Coating Evaluations

Pencil hardness (ASTM D3363) and acetone insolubility are measured for each film before and after exposure to ultraviolet radiation. The data are given in the table below. The acetone insolubility test is carried out by immersing a dry, pre-weighed sample of the film in acetone for 48 hours at 20° to 25° C. The film is removed, dried for 16 hours at 55° to 60° C. in a forced-air oven, and weighed. The weight percent of the insoluble film remaining is calculated from the data.

| | COATING EVALUATIONS | | | |
|---|---|---|---|---|
| | Before Irradiation | | After Irradiation | |
| Description | Pencil Hardness | % Acetone Insolubles | Pencil Hardness | % Acetone Insolubles |
| CAB 553-0.4 (Control) | 2B | 0 | 2B | 0 |
| CAP 504-0.2 (Control) | HB | 0 | HB | 0 |
| Nitrocellulose lacquer (Control) | 3B | 0 | 3B | 0 |
| Starch acetate propionate (Example 1) | B | 0 | B | 0 |
| Starch acetate butyrate (Example 2) | 2B | 0 | 2B | 0 |
| Starch acetate propionate (Example 3) | B | 0 | B | 0 |
| Starch acetate propionate (Example 4) | B | 0 | B | 0 |
| Amylose acetate (Example 5) | B | 0 | B | 0 |
| Amylose acetate-g-TMI (Example 6) | HB | 0 | HB | 0 |
| Example 6 + 20% EBECRYL 220 | B | 0 | 2H | 94 |
| Starch acetate propionate-g-TMI (Example 7) | B | 0 | B | 0 |
| Example 7 + 20% EBECRYL 220 | B | 0 | 2H | 93 |
| Starch acetate butyrate-g-TMI (Example 8) | B | 0 | B | 0 |
| Example 8 + 20% EBECRYL 220 | 2B | 0 | 2H | 92 |
| Amylose acetate-g-IEM (Example 9) | HB | 0 | H | 90 |
| Example 9 + 20% EBECRYL 220 | B | 0 | 2H | 91 |
| Starch acetate propionate-g-IEM (Example 10) | HB | 0 | 2H | 90 |
| Example 10 + 20% EBECRYL 220 | B | 0 | 2H | 96 |
| Example 1 + 20% EBECRYL 220 | 2B | 0 | F | 29 |
| Example 3 + 20% EBECRYL 220 | B | 0 | H | 40 |
| Example 4 + 20% EBECRYL 220 | B | 0 | H | 32 |
| Example 5 + 20% EBECRYL 220 | B | 0 | H | 33 |

Conclusions:
Notes:
Pencil hardness scale is measured as follows: 4B 3B 2B B HB F H 2H 3H 4H where 4H is very hard and 4B is very soft.
Acetone insolubles were measured by the procedure described above.

The invention has been described in detail with particular reference to preferred embodiments thereof, but it will be understood that variations and modifications can be effected within the spirit and scope of the invention.

We claim:

1. A starch ester-urethane having a starch backbone and containing an ester of at least one $C_1$–$C_4$ carboxylic acid at a DS/AGU of about 0.1 to about 2.5, and further containing at least one ethylenically unsaturated group bonded to the starch backbone via a urethane bond at a DS/AGU of about 0.1 to about 2.0.

2. The starch ester-urethane of claim 1 wherein the ester DS/AGU is about 1.5 to about 2.5 and the urethane DS/AGU is about 0.3 to about 0.9, and wherein the intrinsic viscosity of said starch ester-urethane is about 0.2 to about 0.5, measured on a 60:40 parts by weight solution of perchloroethylene:phenol at a concentration of 0.5 g/100 ml solvent at 25° C.

3. The starch ester-urethane of claim 1 wherein said ester is an ester of a carboxylic acid selected from acetic acid, propionic acid, butyric acid, or a mixture thereof.

4. The starch ester-urethane of claim 1 wherein said ethylenically unsaturated group is derived from m-isopropenyl-2,2'-dimethylbenzyl isocyanate, 2-isocyanatoethyl methacrylate, or a mixture thereof.

5. The starch ester-urethane of claim 1 wherein said starch comprises at least about 70 weight % repeating units from amylose, those that comprise at least about 20 weight % repeating units from amylopectin.

6. The starch ester-urethane of claim 1 wherein said starch comprises at least about 20 weight % repeating units from amylopectin.

7. A coating composition comprising:
(A) a starch ester-urethane having a starch backbone and containing an ester of at least one $C_1$–$C_4$ carboxylic acid at a DS/AGU of about 0.1 to about 2.5, and further containing at least one ethylenically unsaturated group bonded to the starch backbone via a urethane bond at a DS/AGU of about 0.1 to about 2.0, and
(B) a solvent in an amount to solubilize (A).

8. The coating composition of claim 7 wherein said solvent is a non-hydroxylic, urethane grade solvent and the weight ratio of solvent:starch ester-urethane is about 1:1 to about 1:20.

9. The coating composition of claim 7 wherein said solvent is benzene, toluene, xylene, methylene chloride, perchloroethylene, chloroform, carbon tetrachloride, chlorobenzene, acetone, 2-butanone, 2-pentanone, methyl acetate, ethyl acetate, propyl acetate, butyl acetate, methyl propionate, ethyl propionate, a dialkylether of ethylene glycol wherein the alkyl groups contain 1 to 4 carbon atoms, a dialkylether of propylene glycol wherein the alkyl groups contain 1 to 4 carbon atoms, or a mixture thereof; and wherein said solvent is present at a weight ratio to the starch ester-urethane of about 1.5:1 to about 5:1.

10. The coating composition of claim 7 further comprising about 1 to about 95 weight % of a copolymerizable oligomer and about 2 to about 8 weight % of a photoinitiator, said percentages being based on the total weight of the starch ester-urethane.

11. A method for curing the coating composition of claim 10 comprising exposing said composition to ultraviolet radiation under conditions effective to result in a substantially crosslinked coating.

12. An article comprising:
 (i) a substrate, and
 (ii) a coating thereon comprising a polymerized starch ester-urethane having a starch backbone and containing an ester of at least one $C_1$-$C_4$ carboxylic acid at a DS/AGU of about 0.1 to about 2.5, and further containing at least one ethylenically unsaturated group bonded to the starch backbone via a urethane bond at a DS/AGU of about 0.1 to about 2.0.

13. The article of claim 12 wherein said coating has a pencil hardness of at least F using ASTM Procedure D-3363 and a percent acetone insolubles of at least about 85%.

14. A process for preparing a starch ester-urethane having a starch backbone and containing an ester of at least one $C_1$-$C_4$ carboxylic acid at a DS/AGU of about 0.1 to about 2.5, and further containing at least one ethylenically unsaturated group bonded to the starch backbone via a urethane bond at a DS/AGU of about 0.1 to about 2.0 comprising:
 (1) contacting starch with an anhydride of a $C_1$-$C_4$ carboxylic acid in the presence of a catalytic amount of an acid catalyst and a $C_1$-$C_4$ carboxylic acid solvent to form a starch ester having a DS/AGU of about 3,
 (2) contacting the starch ester produced from step (1) with a neutralizing agent and a hydrolytic agent under conditions to result in a starch ester having a DS/AGU of about 0.1 to about 2.5,
 (3) removing said hydrolytic agent to result in a substantially water-free starch ester, and
 (4) contacting the starch ester resulting from step (3) with an ethylenically unsaturated isocyanate compound in a non-hydroxylic solvent in the presence of a catalytic amount of a urethane bond-forming catalyst under conditions that promote formation of the desired starch ester-urethane.

15. The process of claim 14 wherein for step (1) the carboxylic acid solvent is acetic acid, propionic acid, or butyric acid; the anhydride is acetic anhydride, propionic anhydride, butyric anhydride or a mixture thereof; the acid catalyst is methanesulfonic acid, methane disulfonic acid, toluenesulfonic acid, hydrochloric acid, sulfuric acid, or phosphoric acid; for step (2) the neutralizing agent is sodium acetate, sodium carbonate, sodium hydroxide, potassium carbonate, potassium acetate, magnesium acetate, calcium carbonate, or calcium hydroxide; and the hydrolytic agent is water; and for step (4) the urethane bondforming catalyst is diethyltin dilaurate, dibutyltin dilaurate, triethylamine, pyridine, diazobicyclo-octane, or dimethylaminopyridine; the isocyanate compound is meta-isopropenyl-2,2'-dimethylbenzyl isocyanate, para-isopropenyl-2,2'-dimethylbenzyl isocyanate, 2-isocyanatoethyl methacrylate, or a mixture thereof; and said non-hydroxylic solvent is benzene, toluene, xylene, methylene chloride, perchloroethylene, chloroform, carbon tetrachloride, chlorobenzene, acetone, 2-butanone, 2-pentanone, methyl acetate, ethyl acetate, propyl acetate, butyl acetate, methyl propionate, ethyl propionate, a dialkylether of ethylene glycol wherein the alkyl groups contain 1 to 4 carbon atoms, a dialkylether of propylene glycol wherein the alkyl groups contain 1 to 4 carbon atoms, or a mixture thereof.

16. The process of claim 14 wherein for step (1) the molar ratio of anhydride:starch is about 3:1 to about 6:1, the amount of acid catalyst is about 2 to about 6% based on the weight of starch, and the weight ratio of solvent:starch is about 4:1 to about 20:1; for step (2) the molar ratio of neutralizing agent:starch ester is about 2:1 to about 10:1; and for step (4) the amount of isocyanate compound is about 1 to about 30% based on the dry weight of starch ester and the weight ratio of non-hydroxylic solvent:starch ester is about 1.5:1 to about 20:1.

17. The process of claim 14 wherein prior to step (1), the starch is contacted with water to result in swelling of the starch followed by exchanging the water with the organic acid solvent used in step (2).

* * * * *